United States Patent
Espino et al.

(10) Patent No.: US 9,918,361 B1
(45) Date of Patent: Mar. 13, 2018

(54) BALLAST COMPATIBILITY BUFFER CIRCUIT FOR LED LAMPS

(71) Applicant: Power Integrations, Inc., San Jose, CA (US)

(72) Inventors: Marvin C Espino, San Jose, CA (US); Donnie Rey G. Saturno, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/629,592

(22) Filed: Jun. 21, 2017

Related U.S. Application Data (60) Provisional application No. 62/404,828, filed on Oct. 6, 2016.

(51) Int. Cl.
*H05B 33/08* (2006.01)

(52) U.S. Cl.
CPC ..... *H05B 33/0815* (2013.01); *H05B 33/0887* (2013.01)

(58) Field of Classification Search
CPC ............ H05B 33/0815; H05B 33/0803; H05B 33/0806; H05B 33/0851; H05B 33/0854; H05B 33/0872; H05B 33/0887; H05B 37/0227; Y02B 20/342; Y02B 20/346; H02M 3/07; H02M 2001/007; F21Y 2115/10

See application file for complete search history.

(56) References Cited

U.S. PATENT DOCUMENTS

| | | | | |
|---|---|---|---|---|
| 8,766,561 | B2 * | 7/2014 | Esaki | H05B 33/0851 |
| | | | | 315/185 S |
| 8,994,276 | B2 * | 3/2015 | Recker | H02J 9/02 |
| | | | | 315/160 |
| 9,277,604 | B2 * | 3/2016 | Hsia | F21V 25/04 |

OTHER PUBLICATIONS

Greg Murphy, Linear LED T8 Replacement Lamps, Oct. 30, 2014, 20 pp.
Laura Peters, How Do Plug-and-Play T8S Stack Up Against Ballast-Bypass LED Lamps? (Magazine), Jul. 22, 2014, 12 pp, vol. 11, Issue 6, LEDs Magazine and Illumination in Focus.

* cited by examiner

*Primary Examiner* — Haissa Philogene
(74) *Attorney, Agent, or Firm* — Andrew J. Borja (57) ABSTRACT

A light-emitting diode (LED) tube including a ballast compatible buffer circuit for interfacing with a ballast circuit and for driving a light-emitting diode LED tube. The LED tube includes an LED driver circuit with first and second input terminals coupled to receive an ac input signal from the ballast circuit, an input rectifier circuit coupled to receive the ac input signal and output a rectified voltage signal, a switching regulator including a regulator switch controlled by a controller that regulates transfer of energy to the LED load through an energy transfer element and the ballast compatible buffer circuit.

19 Claims, 8 Drawing Sheets

BALLAST COMPATIBILITY BUFFER CIRCUIT FOR LED LAMPS

CROSS-REFERENCE TO RELATED APPLICATIONS

This application claims the benefit of U.S. Provisional application 62/404,828 filed on Oct. 6, 2016.

BACKGROUND INFORMATION

Field of the Disclosure

The present disclosure relates to ballast compatibility of LED lamps; more specifically, it relates to a buffer circuit for safe replacement of LED tubes with drivers in the existing ballast fixtures.

Background

LED lighting has become popular in the industry due to the many advantages this technology provides. For example, LEDs typically have a longer lifespan, pose fewer hazards, and provide increased visual appeal when compared to other lighting technologies, such as compact fluorescent lamp (CFL) or incandescent lighting technologies.

A recent generation of efficient lighting fixtures was designed for discharge lamps, such as fluorescent lamps operating with either electronic or magnetic ballasts to stabilize their operating characteristic. An electrical ballast is a device intended to limit the amount of current in an electric circuit. Many existing industrial and residential lighting systems use ballast operating lighting fixtures which, compared to the new improved technology of LED lamps, offer lower light efficiency and shorter life span. LED lamps typically include their specific driver in their tube/bulb for safe functioning with regulated current, and to maximize their lighting efficiency, with or without light dimming characteristics.

On the other hand, electronic ballasts are commonly required to stabilize operation of fluorescent lamps that are designed to operate with a specific start-up sequence. Oftentimes, they operate at high-voltage and high frequency during ignition phase before settling to low-voltage, high-frequency operation when the lamp is emitting light. If the ballast does not detect the lamp ignition, the start-up sequence will repeat.

Many end users of LED lamps want to replace their old less efficient lighting system of discharge lamps (most often fluorescent lamps) with more efficient, long lasting LED lamps. LED lamps advantageously improve lighting characteristics and reduce user's electric utility consumption and maintenance expenses. However, the barrier they face is the rewiring of the entire existing lighting fixture to remove existing ballast. In other words, switching to LED lamps is costly and necessarily involves time delay in their operation. Presently, existing plug-and-play products in the LED tube market are limited to specific applications which generally are not compatible with various ballast configurations. LED drivers are incompatible with electronic ballast because it does not present fixed impedance as seen by the ballast. Moreover, the LED driver will be subjected to continuous high-voltage input which could exceed the ratings of the circuit components, such as metal oxide varistors (MOVs), and semiconductor switching devices, such as metal-oxide field-effect transistors (MOSFETs), which may result in safety failure.

The output of an electronic ballast also has a much higher frequency (+20 kHz or higher) than ordinary AC line which, even with electromagnetic (EM) ballast, is 50 Hz or 60 Hz. Therefore, direct replacement of an LED tube in an existing lighting fixture with electronic ballast can result in fatal failure/damage of the circuit components.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description numerous specific details are set forth in order to provide a thorough understanding of the present invention. It will be apparent, however, to one having ordinary skill in the art that the specific details need not be employed to practice the present invention. In other instances, well-known systems, devices, or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

For purposes of this disclosure, "ground" or "ground potential" refers to a reference voltage or potential against which all other voltages or potentials of a circuit or integrated circuit (IC) are defined or measured.

A ballast compatible buffer circuit that allows an end user of an LED lamp to directly replace an existing discharge tube with an LED lighting tube is described. In one embodiment, the circuitry provides efficient, safe and reliable operation while obviating the need for rewiring and costly time delays.

Figure 1:
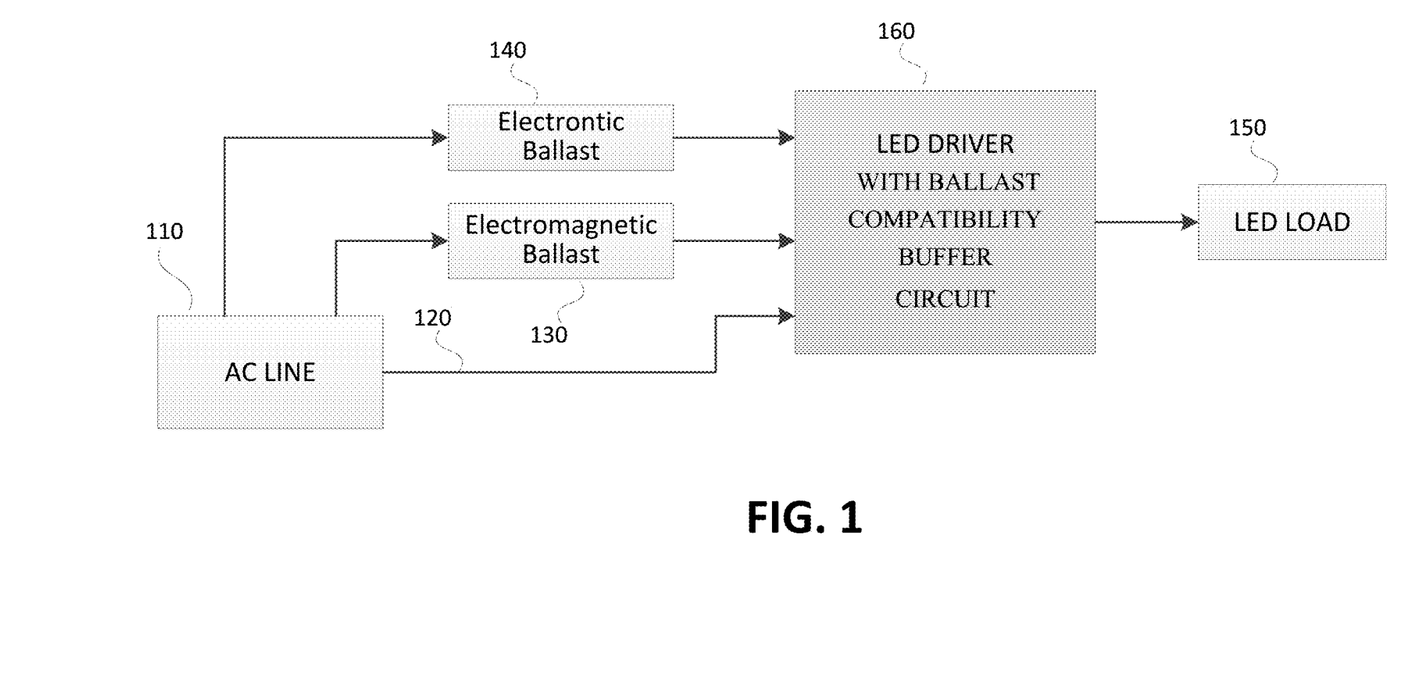
FIG. 1 is an example circuit diagram of a ballast compatibility buffer circuit in a lighting fixture.

FIG. 1 is an example circuit block diagram of an LED driver with ballast compatibility buffer circuit 160 in a lighting fixture. As shown, the LED driver with ballast compatibility buffer circuit 160 provides an output signal that drives LED load 150. In common applications, the ballast compatibility buffer circuit 160 receives power from an AC line 110, with the electric wiring either being made directly (e.g., via link 120), through electromagnetic ballast 130, or through electronic ballast 140 to LED load (tube) 150. It is appreciated that LED driver with ballast compatibility buffer circuit 160 may be located inside the LED tube. In one embodiment of the present disclosure, the LED driver with ballast compatibility buffer circuit 160 is placed at the interface of AC line, magnetic ballast or electronic ballast and provides the benefits of upgrading the light fixture to LED lamps without having to rewire the existing light fixture.

Figure 2:
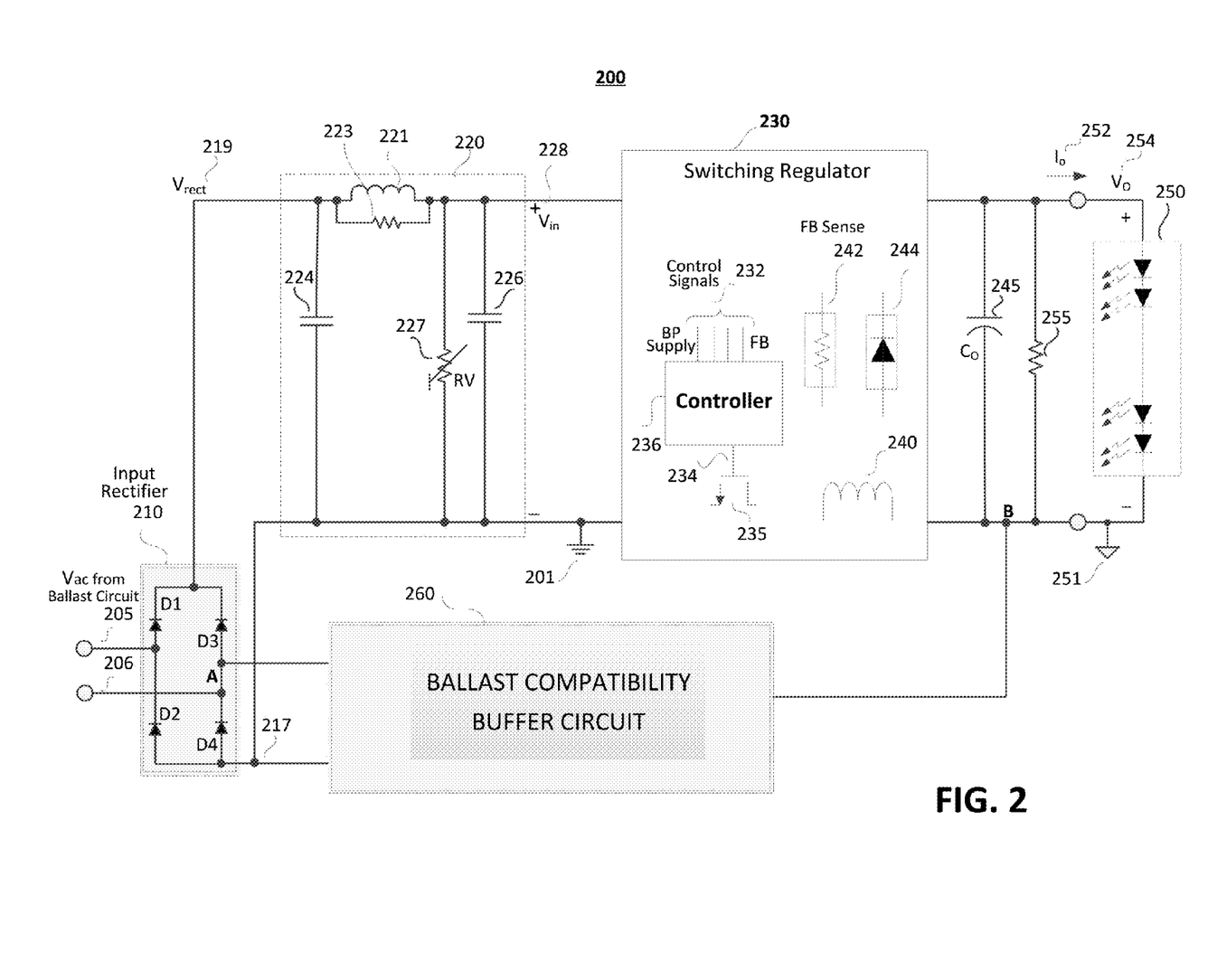
FIG. 2 is an example circuit diagram of an LED driver equipped with ballast compatibility buffer circuit.

FIG. 2 is an example circuit schematic diagram 200 of an LED driver equipped with ballast compatibility buffer circuit. Schematic 200 includes a switching regulator 230 (power converter) operating as an LED driver. The components of switching regulator 230 are shown including a power switch 235 controlled by a drive signal 234 output from a controller block 236. Controller block 236 is coupled to receive the control signals 232 from operational nodes of the switching regulator to generate drive signal 234.

In operation, switching regulator 230 regulates the transfer of energy to an output load, i.e., an LED string 250, through an energy transfer element illustrated as an inductor 240. The control signals 232 are shown including a feedback signal FB and supply voltage BP. Switching regulator 230 may also include feedback sense components, which, in the embodiment of FIG. 2, are shown by a resistor 242 and a diode 244.

The ac input $V_{ac}$ applied to input terminals 205 and 206 may be provided either directly from an ac line 50/60 Hz power network, or through a electromagnetic or electronic ballast pre-existing on the lighting fixture. The ac input is rectified through input rectifier 210, with the rectified voltage $V_{rect}$ 219 passes through an input electromagnetic interference (EMI) filter 220. Input rectifier 210 is shown as a bridge rectifier which includes cross-coupled diodes D1-D4. The EMI filter 220 is shown disposed between input rectifier 210 and switching regulator 230. EMI filter 220 includes a filter inductor 221 coupled in parallel with a resistor 223. The input and output ends of filter inductor 221 are respectively coupled to ground 201 through the X-filter capacitors 224 and 226. A variable resistor RV 227 is shown coupled in parallel with capacitor 226 on the output side of filter 220. The filtered voltage $V_{in}$ 228 is shown coupled to the input of switching regulator 230.

As shown in FIG. 2, the output of switching regulator 230 is applied across a bulk output capacitor $C_O$ 245 and resistor 255 to provide a dc output voltage $V_O$ 254 and output current $I_O$ 252 to LED string load 250. Practitioners in the art will appreciate that in the case of an isolated switching regulator, ground 201 of the input side of switching regulator 230 may differ from ground 251 at the output side of switching regulator 230.

Continuing with the example of FIG. 2, a ballast compatibility buffer circuit 260 is shown coupled between one input ac line (terminal A) and return line 217 of the rectified voltage $V_{rect}$ 219. So configured, ballast compatibility buffer circuit 260 may provide a bypass path from terminal B, output ground 251, for the electrical signals that otherwise may exceed ratings of the sensitive components in switching regulator 230 of LED driver 200 and which could interrupt or cause failure in LED driver 200.

Figures 6A, 6B:
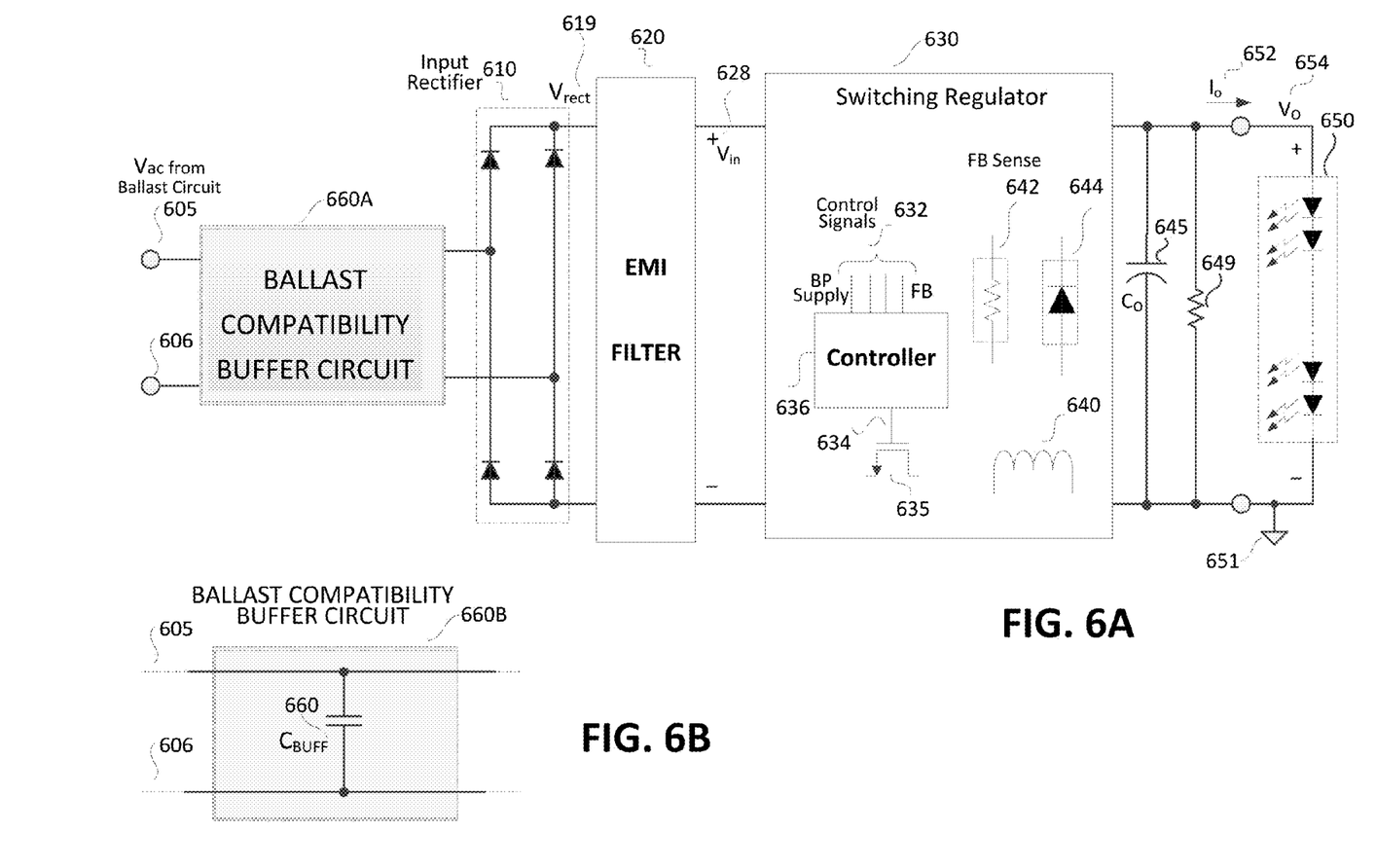
FIG. 6A is another example circuit schematic diagram of a ballast compatibility buffer circuit.
FIG. 6B shows an example ballast compatibility buffer circuit.

Ballast compatibility buffer circuit 260 is configured to provide a low impedance conduction path to bypass high frequency components of the electronic ballast output signal to prevent hazardous damage to LED driver 200. In another embodiment shown in FIG. 6A, a ballast compatibility buffer circuit 660A may be coupled directly to input ac terminals 605 and 606, with the output of ballast compatibility buffer circuit 660A being coupled to the input of bridge rectifier 610. This latter configuration also provides a low impedance conduction path to bypass high frequency components of the electronic ballast output signal. FIG. 6B illustrates that in one embodiment, a ballast compatibility buffer circuit 660B may comprise a buffer capacitor 660 coupled across input ac terminals 605 and 606.

Figure 3A:
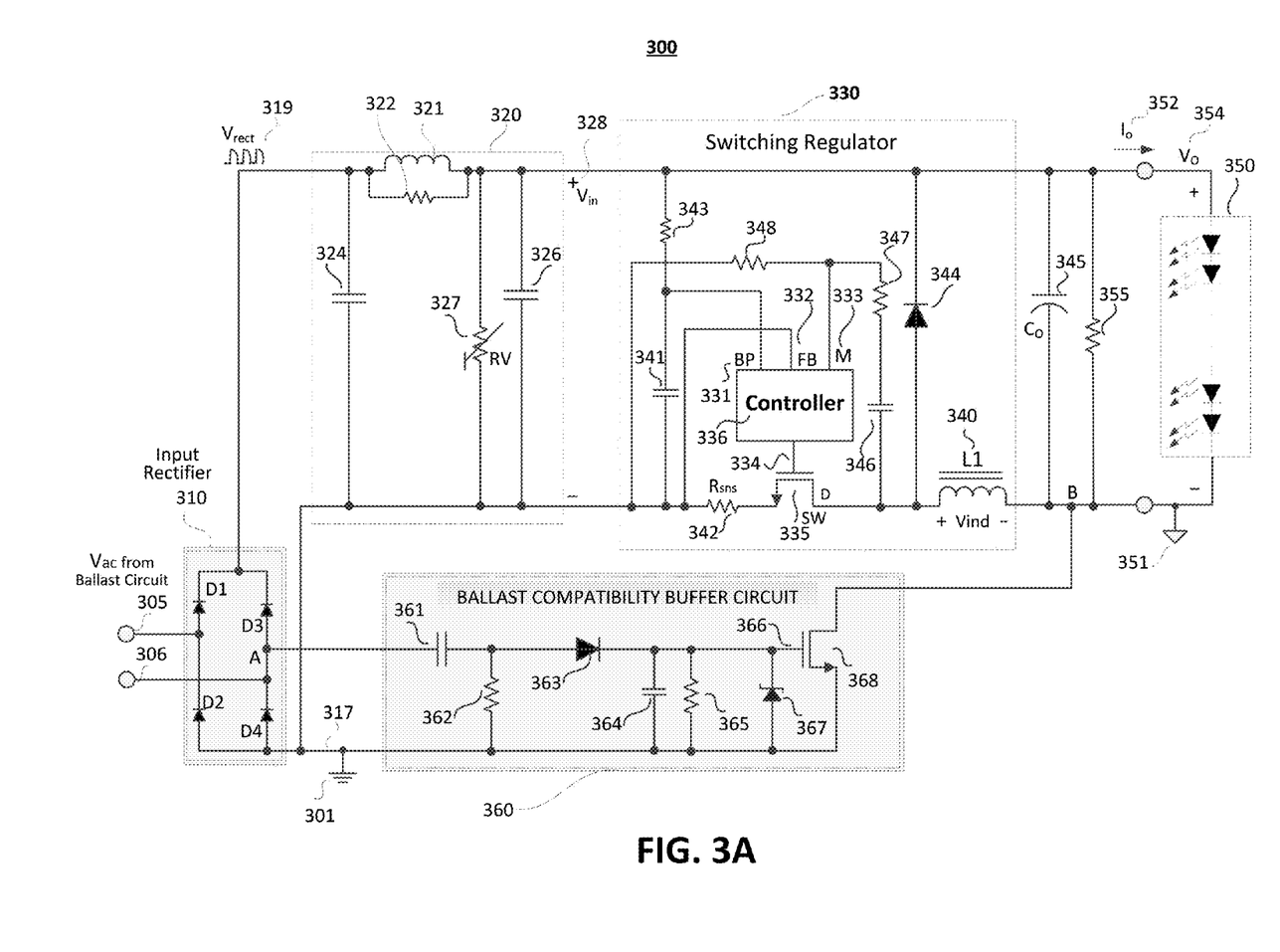
FIG. 3A is an example circuit schematic diagram of a ballast compatibility buffer circuit.

FIG. 3A is an example circuit schematic diagram of a ballast compatibility buffer circuit 300 which includes detailed circuits of switching regulator 330 and ballast compatibility buffer circuit 360. The other components are substantially the same as shown in FIG. 2. Input ac terminals 305 and 306 receive an ac signal $V_{ac}$ either directly from an ac line (50/60 Hz), through an electronic ballast, or through a electromagnetic ballast. Persons of skill in the art understand that the output of a magnetic ballast is substantially a 50/60 Hz signal, but with some distortions due to the relatively large inductance value of the electromagnetic ballast. Persons of skill in the art further understand that if input rectifier 310 of LED driver 300 is coupled to receive the output signal of an electronic ballast, the $V_{ac}$ signal output from the electronic ballast is a resonance signal having a frequency of approximately 20-30 kHz.

As shown, LED driver 300 illustrates an example Buck topology for switching regulator 330 having a low-side switching device 335 coupled to an energy transfer element illustrated as inductor L1 340. In one example, the low-side switching device 335 may be referred to as a switch 335, or a switching device 335. The low side coupling of inductor L1 340 and switching device 335 provides a more stable and robust functionality since switching regulator 330 is referenced to a return ground. Note that the rectified voltage $V_{rect}$ 319 output from input rectifier 310 passes through an input EMI filter 320. The EMI filter 320 includes a filter inductor 321 coupled in parallel with a resistor 322. The input and output ends of filter inductor 321 are respectively coupled to input terminal 305 and 306 through the X-filter capacitors 324 and 326. The resulting filtered voltage $V_{in}$ 328 is shown coupled to the input of switching regulator 330.

Switching regulator 330 includes a controller 336 that receives a supply voltage on the bypass (BP) terminal 331 derived from filtered voltage $V_{in}$ 328 through a resistor 343 having one end coupled to the high side of filtered voltage $V_{in}$ 328. The other end of resistor 343 is connected to BP terminal 331 and a capacitor 341. The other end of capacitor 341 is coupled to return ground 301. A feedback (FB) signal is input to a controller terminal 332 of controller 336. The FB signal is received from a switch current sense resistor $R_{sns}$ 342. A multi-function (M) controller terminal 333 is shown connected to resistors 347 and 348. The other end of resistor 348 is connected ground 301. Resistor 347 is coupled in series with capacitor 346 between controller terminal M 333 and the drain terminal of switching transistor 335. The source terminal of switching transistor 335 is connected to current sense resistor $R_{sns}$ 342.

As configured, controller 336 senses the input and output voltages during the off-time and on-time of the switch SW 335. The drive signal 334 output from controller 336 controls switching of the switch 335 and thereby regulates transfer of energy through inductor L1 340 to the output load 350. In the example shown, load 350 is a string of LEDs with regulated current. As appreciated by persons skilled in the art, in the Buck switching regulator shown in FIG. 3A during the off-time of switch SW 335 the current in inductor 340 circulates back to the high-side through diode 344. Output bulk capacitor $C_O$ 345 functions to smooth the output voltage $V_O$ 354 applied to load 350, with resistor 355 providing a minimum load for improved functionality of LED driver 300.

In the embodiment shown, ballast compatibility buffer circuit 360 includes a bypass switching device 368 controlled by signal 366. In one example, the bypass switching device 368 may be referred to as a switching device. In one example, switching device 368 can be a MOSFET switch, an SCR, or any other controlled semiconductor switch. Ballast compatibility buffer circuit 360 senses the line frequency and bypasses LED driver 300 when an electronic ballast input is detected. Control signal 366 is generated to turn on the bypass switching device is in response to sensed high-frequency components of the $V_{ac}$ signal applied to terminals 305 and 306. Note that the input of ballast compatibility buffer circuit 360 is coupled between terminal A, which is coupled to input line 306, and return line 317, which is the source terminal of switching device 368, which is coupled to ground 301. A high-pass filter consisting of capacitor 361 and resistor 362 is utilized to only pass the high-frequency components of the $V_{ac}$ signal from the output of the ballast circuit on terminals 305 and 306. In the event that a high-frequency signal is detected from ballast circuit, and passed through the high-pass filter, that signal is rectified by diode 363 and smoothed by capacitor 364 coupled in parallel with a discharge resistor 365. The high-frequency signal is thus converted to a dc control signal 366. In response to the detected high-frequency signal from the electronic ballast, dc control signal 366 turns on switching device 368, thereby bypassing the high-frequency signal away from inductor 340 and switch SW 335. A zener diode 367 is connected between the gate of bypass switching device 368 and ground 301 to safely limit the voltage level applied to the gate.

Practitioners will appreciate that utilizing relatively fast diodes having a reverse in input rectifier 310 advantageously accommodates the high frequency operation of the electronic ballast. In one example, the relatively fast diodes have a reverse recovery time (rrt) of 250 nanoseconds.

Figure 3B:
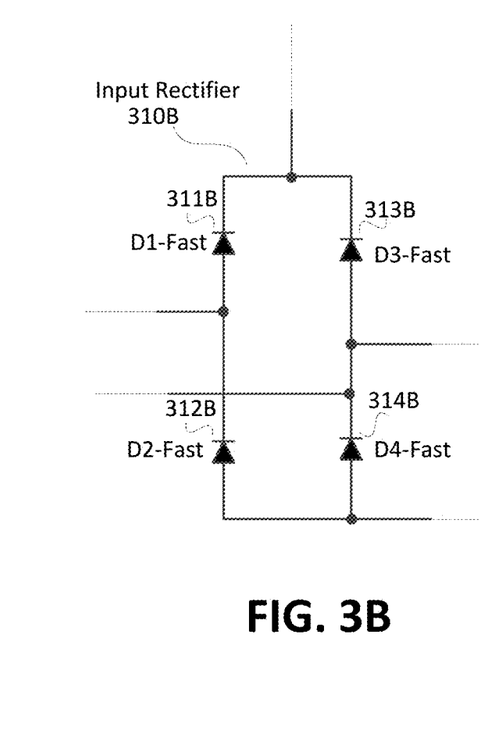
FIG. 3B-3D are various example circuit schematic diagrams of an input rectifier for use in a ballast compatibility buffer circuit.
Figure 3C:
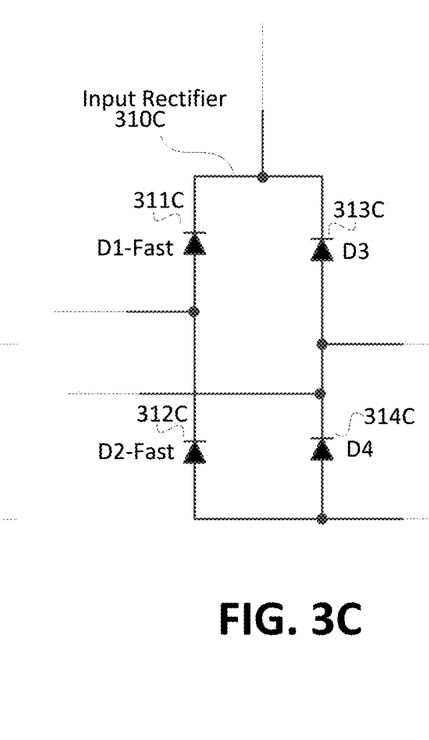
Figure 3D:
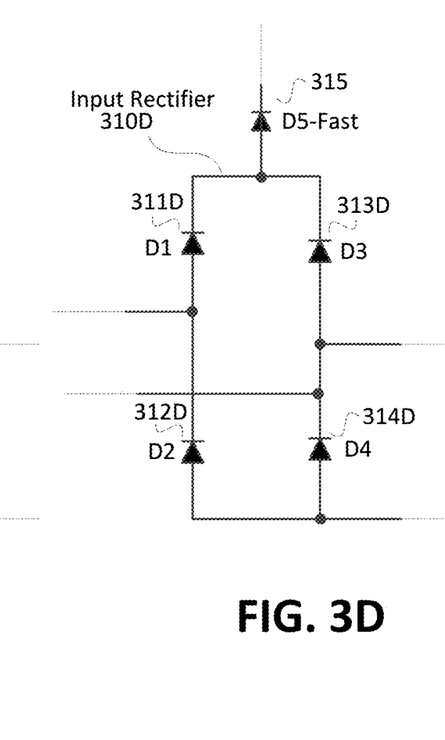

FIG. 3B illustrates a first optional implementation of input rectifier 310 which includes four fast recovery diodes D1-Fast 311B, D2-Fast 312B, D3-Fast 313B, and D4-Fast 314B. FIG. 3C illustrates a second optional implementation of input rectifier 310 which includes two fast recovery diodes D1-Fast 311B, and D2-Fast 312B, for one leg of the bridge rectifier. FIG. 3D illustrates a third optional implementation which adds a fast recovery diode D5-Fast 315, in series with the output of bridge rectifier 310. It is appreciated that each of options shown in FIGS. 3B, 3C and 3D has a different effect on the total efficiency. The configuration of FIG. 3B, which utilizes four fast recovery diodes may provide maximum efficiency. FIG. 3D with a single additional fast recovery diode may provide less efficiency, which is still acceptable, as a tradeoff with component cost. It should be understood that any of the input rectifiers disclosed for use in an LED driver may utilize any of the options shown in FIGS. 3B-3D.

Figure 4:
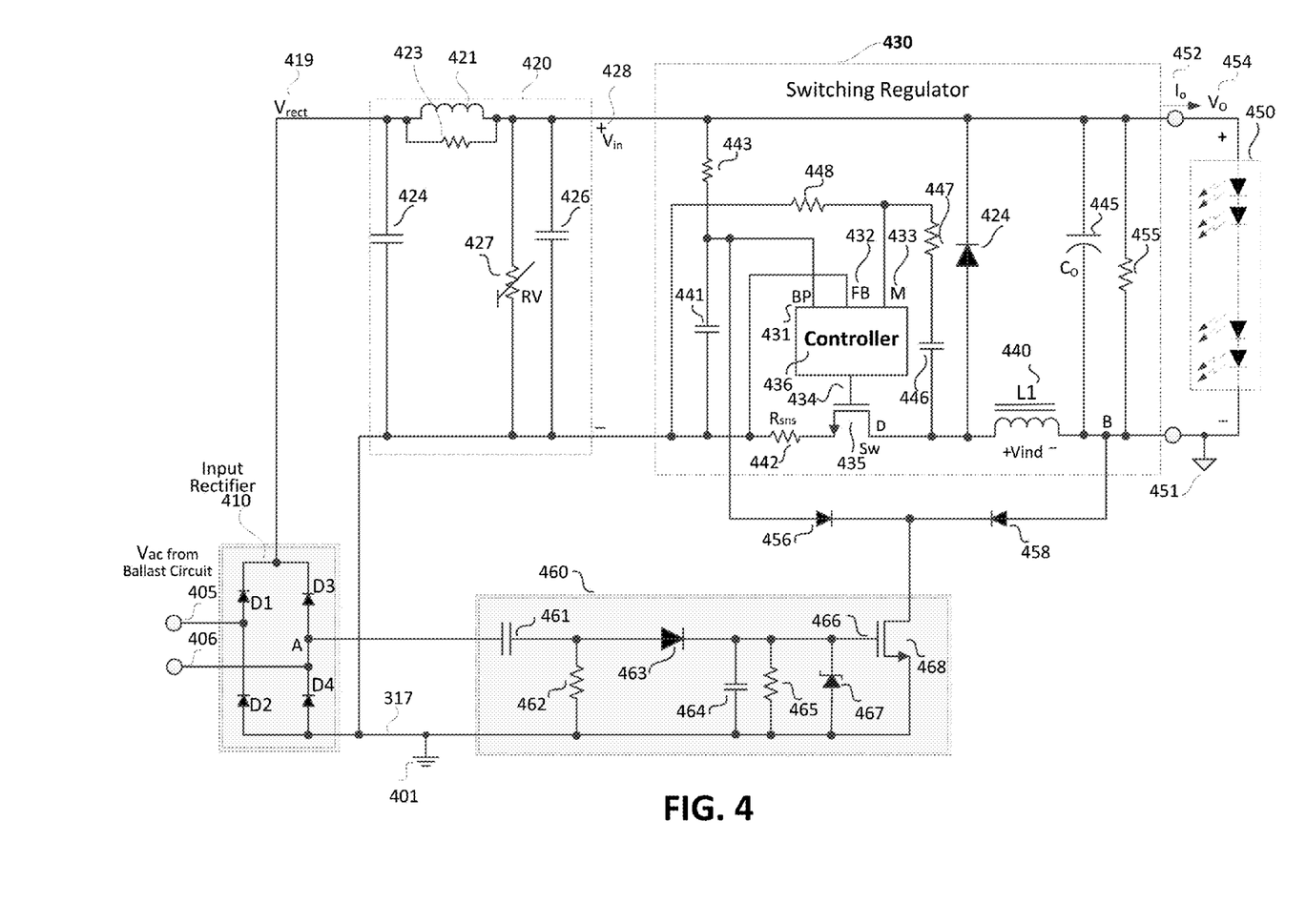
FIG. 4 is another example circuit schematic diagram of a ballast compatibility buffer circuit.

FIG. 4 is another example circuit schematic diagram of a ballast compatibility buffer circuit which modifies the LED driver shown in FIG. 3A by adding diodes 456 and 458 to the driver circuit. Diode 456 insures that when switching device 468 is turned ON (closed and conducting) the high frequency components of the electronic ballast is bypassed, and supply terminal BP 431, which receives a supply voltage for controller 436 across capacitor 431 is pulled to ground 401 (primary ground for controller 436). This ensures deactivation of the LED driver so there is no conduction through switch SW 435. Meanwhile, diode 458 operates to block any reverse current flow to output terminal B. All other component functions are the same as that described in conjunction with the circuit diagram of FIG. 3A.

Figure 5A:
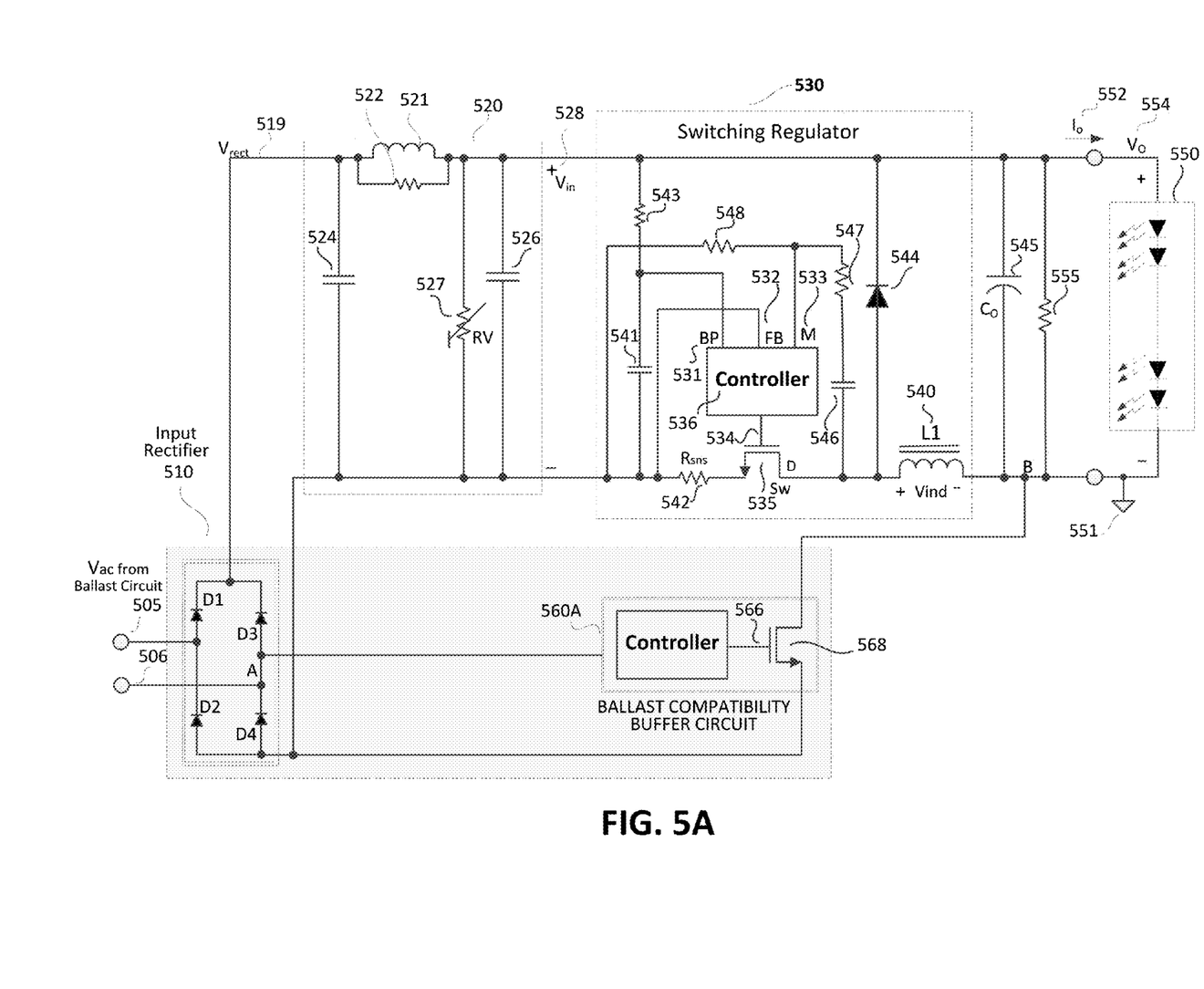
FIG. 5A is an example circuit schematic diagram of an integrated circuit (IC) that includes a ballast compatibility buffer circuit having a bypass switching device

FIG. 5A is an example circuit schematic diagram of an integrated circuit (IC) solution that incorporates bypass switching device 568 and the ballast compatibility buffer circuitry into a single IC package 560A. Note that IC package 560A has three terminals for ease of use with the LED driver. All other component functions are the same as that described in conjunction with the circuit diagrams of FIG. 3A and FIG. 4.

Figure 5B:
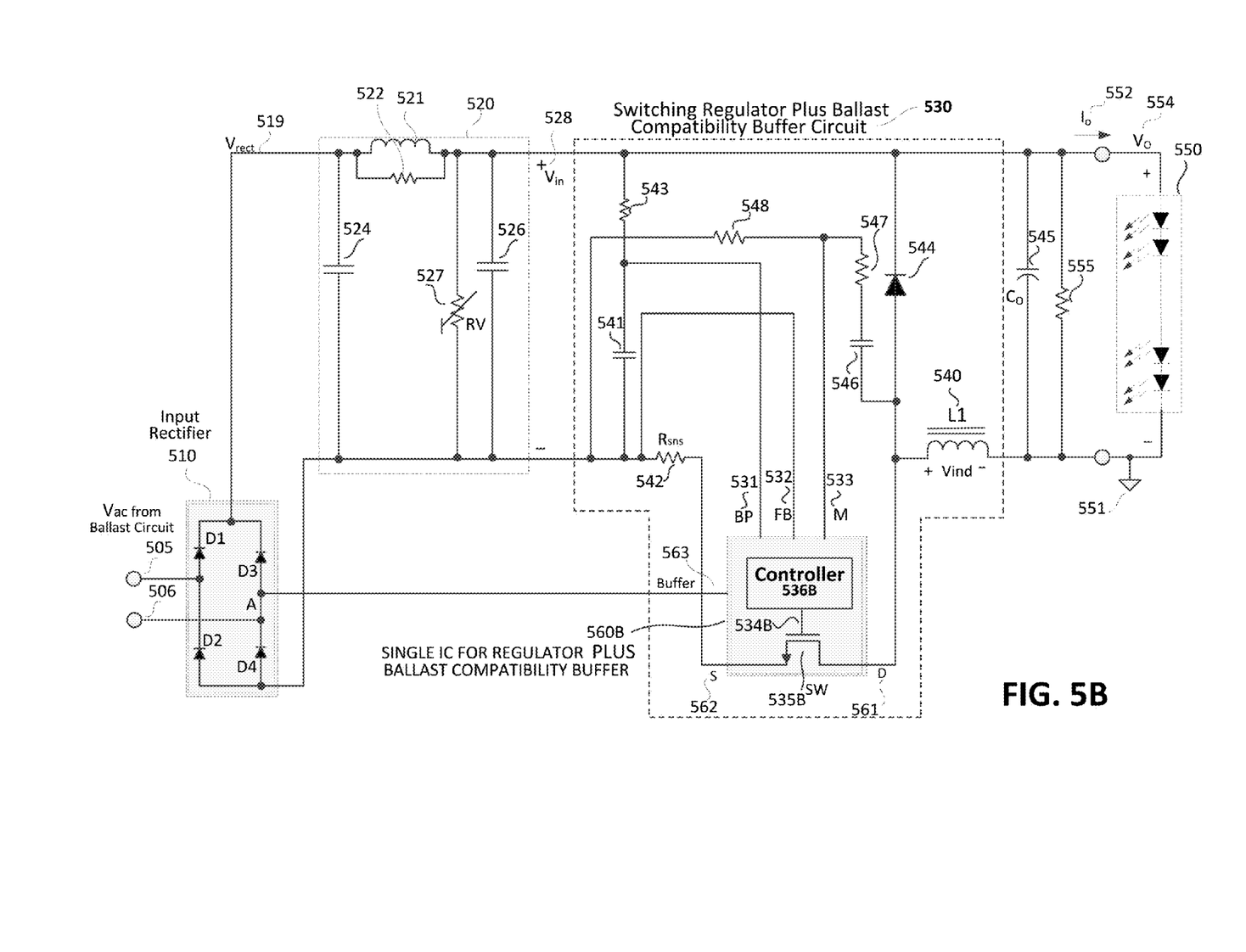
FIG. 5B is an example circuit schematic diagram of an integrated circuit (IC) that includes a ballast compatibility buffer circuit with a power switch and controller of an LED driver.

FIG. 5B is another example circuit schematic diagram of an integrated circuit (IC) LED driver solution wherein the ballast compatibility buffer circuitry is included in a single integrated circuit IC package 560B along with the power switch 535B and the switching regulator 530. In this embodiment, a single switch 535B serves for both functions of regulating output power in LED driver as well as bypassing the LED driver whenever the high frequency signals from a ballast circuit is detected. In one example, controller 536B includes control blocks to control switching for regulation of LED driver output power as well as the control block for the ballast compatibility buffer circuit. Controller 536B is configured to provide switching signal 534B for dual functionality of the switch 535B; namely, for LED driver output power regulation when high-frequency signals (from an electronic ballast) are not detected, and for bypassing high-frequency signals from the electronic ballast when the electronic ballast is detected. Note that IC package 560B is shown including the control terminals BP 531, feedback (FB) terminal 532 and multifunction (M) terminal 533 to receive LED driver sense and supply signals, buffer terminal 563 to receive ballast detection signal, as well as the drain terminal 561 and source terminal 562 for the dual function switch 535B.

FIG. 6A is another example circuit schematic diagram of a ballast compatibility buffer circuit. As discussed above, the embodiment of FIG. 6A illustrates a second option for locating a ballast compatibility buffer circuit 660A ahead of input rectifier 610. This embodiment provides a bypass low impedance conduction path at the input terminals 605 and 606 of the LED driver. In the configuration shown, ballast compatibility buffer circuit 660A prevents high-voltage, high-frequency output pulses of the ballast circuit from causing damage and failure to the LED driver. This is achieved by directly bypassing the high frequency signals directly to return ground (terminal 606).

The LED driver shown in FIG. 6A may include all the general blocks and components as described in conjunction with FIG. 3A. That is, the components in input rectifier 610, EMI filter 620, switching regulator 630, and the output stage are the same as their counterparts in FIG. 3A. It is appreciated that the input rectifier circuit 610 as mentioned before may include one or more fast reverse recovery time diodes.

FIG. 6B shows an example ballast compatibility buffer circuit implemented as a small X-capacitor $C_{BUFF}$ 660 coupled across at input terminals 605 and 606. X-capacitor $C_{BUFF}$ 660 operates to bypass high-frequency ballast signals back to the ground return line. The small capacitance at input terminal introduces a fixed low impedance load to the ballast output that covers for fluctuation of the LED driver impedance.

The above description of illustrated examples of the present disclosure is not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example circuit diagrams, methods of operation, etc., are provided for explanation purposes and that other circuits and devices may be employed in other embodiments and examples in accordance with the teachings of the present disclosure. These modifications can be made to the examples provided in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A light-emitting diode (LED) tube including a ballast compatible buffer circuit for interfacing with a ballast circuit and for driving a light-emitting diode LED load, the LED tube comprising:
    an LED driver circuit which includes:
        first and second input terminals coupled to receive an ac input signal from the ballast circuit;
        an input rectifier circuit coupled to receive the ac input signal and output a rectified voltage signal;
        a switching regulator having an input side coupled to receive the rectified voltage signal, and an output side coupled to the LED load, the switching regulator including a regulator switch controlled by a controller that regulates transfer of energy to the LED load through an energy transfer element; and
    the ballast compatible buffer circuit which includes:
        first circuitry for detecting a high-frequency signal of the ballast circuit, the first circuitry generating a bypass control signal responsive to the high-frequency signal;
        a bypass switching device coupled to the output side of the switching regulator, responsive to the bypass control signal the bypass switching device being activated to bypass the high-frequency signal away from the energy transfer element.

2. The LED tube of claim 1 wherein the first circuitry comprises a high-pass filter.

3. The LED tube of claim 1 wherein the first circuitry further comprises a rectifier circuit that converts the high-frequency signal to the bypass control signal.

4. The LED tube of claim 1 wherein the energy transfer element comprises an inductor, the bypass switching device comprising a MOSFET having a gate coupled to receive the bypass control signal and a drain coupled to one end of the inductor.

5. The LED tube of claim 1 wherein ballast compatible buffer circuit has an input coupled to the first and second input terminals through the input rectifier circuit.

6. The LED tube of claim 1 wherein the input rectifier circuit comprises a bridge rectifier having a plurality of diodes, one or more of the diodes having a reverse recovery time of 250 ns or less.

7. The LED tube of claim 1 wherein the LED driver circuit further comprises an electromagnetic interference (EMI) filter circuit having an input coupled to receive the rectified voltage signal, the EMI filter outputting a filtered voltage to the input side of the switching regulator.

8. The LED tube of claim 1 wherein the ballast compatible buffer circuit is incorporated in a single integrated circuit (IC) package.

9. The LED tube of claim 8 wherein the single IC package includes the ballast compatible buffer circuit and the input rectifier circuit.

10. The LED tube of claim 8 wherein the single IC package includes the ballast compatible buffer circuit, the controller, and the regulator switching device.

11. The LED tube of claim 10 wherein the bypass switching device and the regulator switching device are incorporated in a single integrated circuit (IC) package, the bypass switching device and the regulator switching device comprising a single switching device, and further wherein the controller includes the ballast compatibility buffer circuit.

12. The LED tube of claim 1 further including a clamping device that limits the bypass control signal so that it does not exceed a certain predetermined voltage.

13. The LED tube of claim 12 wherein the clamping device comprises a zener diode coupled to an input of the bypass switching device.

14. The LED tube of claim 1 wherein the switching regulator is configured as a Buck converter.

15. A light-emitting diode (LED) tube for interfacing with a ballast circuit and for driving a light-emitting diode LED load, the LED tube comprising:
    an LED driver circuit which includes:
        first and second input terminals coupled to receive an ac input signal from the ballast circuit;
        an input rectifier circuit coupled to receive the ac input signal and output a rectified voltage signal;
        a switching regulator having an input side coupled to receive the rectified voltage signal, and output side that outputs a regulated output signal to the LED load, the output side including an energy transfer element that regulates transfer of energy to the LED load; and
        a ballast compatible buffer circuit connected directly across the first and second input terminals, the ballast compatible buffer circuit including first circuitry for bypassing a high-frequency signal produced by the ballast circuit to a ground return line.

16. The LED tube of claim 15 wherein the input rectifier circuit includes one or more fast reverse recovery time diodes.

17. The LED tube of claim 15 wherein the first circuitry comprises a buffer X-capacitor.

18. The LED tube of claim 15 wherein the ground return line is coupled to the second input terminal.

19. A method of operation for a ballast compatible buffer circuit for use in a light-emitting diode (LED) driver interfacing with an electronic ballast circuit that generates high-frequency signals, the method comprising:
  filtering the high-frequency signals to generate a control signal therefrom; and
  applying the control signal to a bypass switching device, thereby causing the bypass switching device to close a direct bypassing path for the high frequency signals from an output of the LED driver to an ac input return line.

* * * * *